Oct. 10, 1967 E. WIEDEMANN 3,346,478
TISELIUS TYPE ELECTROPHORESIS APPARATUS WITH TELEOBJECTIVES
Filed Sept. 9, 1963 2 Sheets-Sheet 2
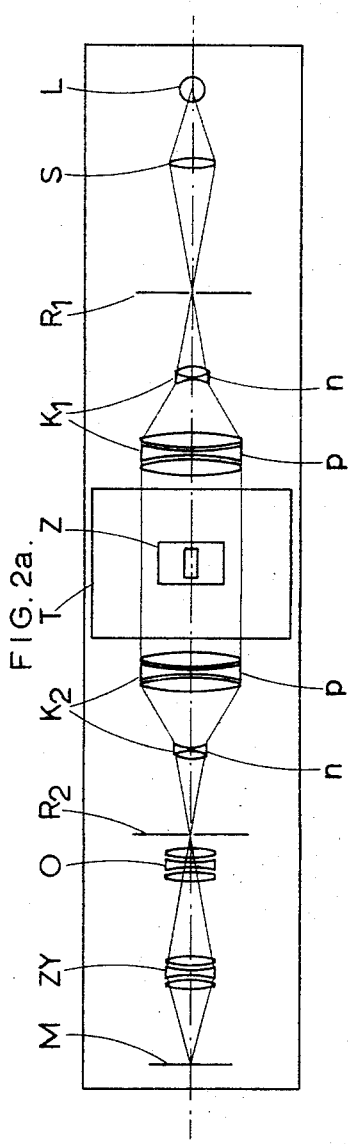
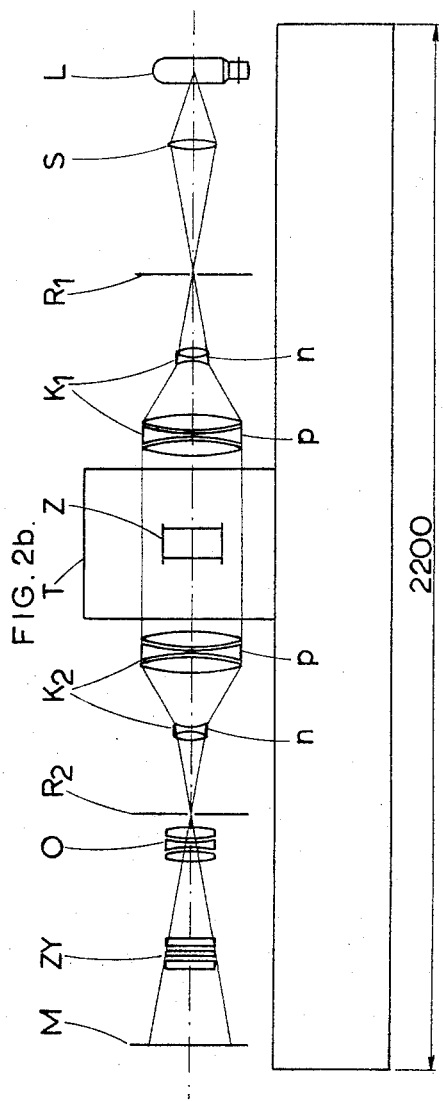
Erwin Wiedemann,
INVENTOR
BY Wenderoth, Lind
and Ponack, ATTORNEYS 3,346,478
TISELIUS TYPE ELECTROPHORESIS APPARATUS WITH TELEOBJECTIVES
Erwin Wiedemann, Riehen, Switzerland, assignor to Sandoz Ltd. (also known as Sandoz A.G.), Basel, Switzerland
Filed Sept. 9, 1963, Ser. No. 307,613
Claims priority, application Switzerland, Sept. 25, 1962, 11,296/62
2 Claims. (Cl. 204—299)

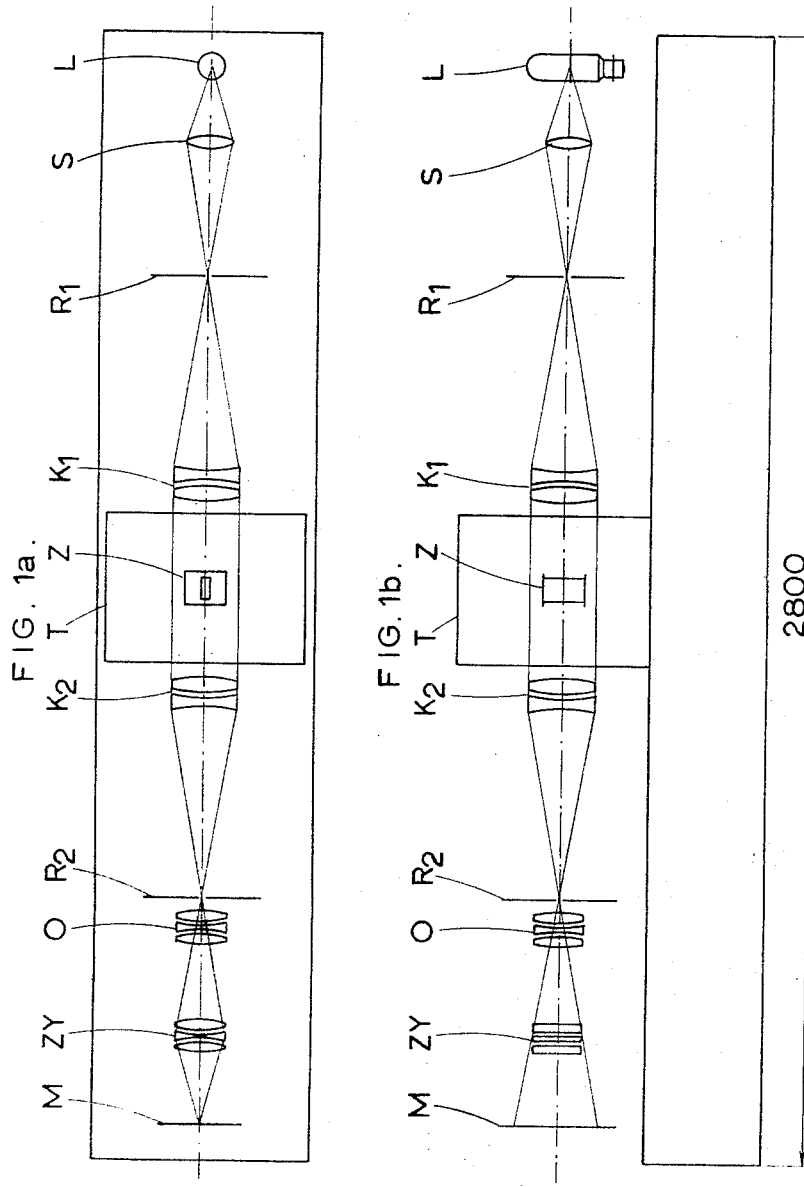

ABSTRACT OF THE DISCLOSURE

The disclosure is directed to a Tiselius type electrophoresis apparatus including a pair of collimator lens arrangements each consisting of a teleobjective of a diameter not exceeding 100 mm. and having spherical and chromatic aberrations less than $\frac{1}{1000}$ of the focal length and a distortion not greater than .03 percent for a 3° angle. Each teleobjective consists of a positive member constituted by two biconvex lenses with a biconcave lens between the same, all three lenses being air spaced, and of a negative member constituted by a biconcave lens and a biconvex lens.

---

The present invention relates to improvement of electrophoresis apparatus employing Tiselius cells as described in the literature (see, f.i., E. Wiedemann, in: Hoppe-Seyler/thierfelder, 10. Aufl., Bd. I, S. 54 ff., Springer, Berlin, 1954). Electrophoresis apparatus of conventional construction, when it is constructed for use with cell sets of standard size and the use of preparative cell sets having a height of 80 to 120 mm., has a great overall length, i.e. at least 12 feet. This greate overall length, which is highly disadvantageous, is due to the optical system, especially to the collimator or schlieren lenses, the focal power of which cannot be reduced to less than 1200 mm. each if the optical correction is to be adequate, since, in this case the relative aperture may not exceed a ratio of 1:10.

Relatively large size apparatus has previously been described which overcame the disadvantage of this great length by using collimators constituted by mirror lens objectives, but there was a potential loss of light in the centre due to the use of these mirror lens objectives. This potential loss of light, although not objectionable in said apparatus of relatively large size, is objectionable in apparatus using collimators and cells of diameters and heights respectively not greater than 100 mm.

It is an object of the present invention to overcome or reduce this potential loss of light caused by the use of the mirror lens objectives with apparatus using collimators and cells of diameter and heights respectively of at most 100 mm., especially apparatus designed for observing standard analytical cells which normally have a height of 84 mm.

The present invention thus provides Tiselius type electrophoresis apparatus for recording or observing moving liquid boundaries, characterized in that each collimator or schlieren lens consists of a teleobjective of a diameter of at most 100 mm. and having spherical and chromatic aberrations less than $\frac{1}{1000}$ of the focal length and a distion at most 0.3% for a 3° angle.

The term "teleobjective" as used herein designates a system consisting of a positive member (i.e. lens or group of lenses) and a negative member, the negative member being placed between the positive member and its focal point and the power of both members being chosen in such a way that the system as a whole has a focal distance shorter than its focal length. As will be seen hereafter, the teleobjective used in the specific embodiment described herein, although constituted by only 2 members, consists of a total of 5 lenses.

It was found that the positive member is preferably a triple system consisting of two biconvex lenses with a biconcave lens between them, all three lenses being air spaced, and the negative member is preferably a double system consisting of a biconcave lens and a biconvex lens which may be cemented. Preferably also, the two teleobjectives in the apparatus are similar in every respect.

One embodiment of the invention will now be described with reference to the accompanying diagrammatic drawings, in which:

FIGURES 1a and 1b show an elevation and plan view respectively of a conventional apparatus, and FIGURES 2a and 2b show an elevation and plan view respectively of apparatus employing the optical system provided by the present invention.

In FIGURES 1a and b and 2a and b L designates a light source (e.g. a tungsten ribbon lamp or gas discharge lamp), S a condenser lens, $R_1$ a first revolvable disc fitted with diffusing means in the form of slits and gratings (for diagram and interference records), $K_1$ a first collimator (also called schlieren lens), T a thermostat which contains a cell Z, $K_2$ a second collimator, $R_2$ a second revolvable disc fitted with diffusing means in the form of an oblique edge, oblique slit and phase plates (for diagram and interference records), O a spherical objective producing an image of the cell Z onto a screen or photographic layer M, and ZY a cylindrical lens system producing an image of an object in the focal plane of the second collimator lens on the screen or photographic layer M only in the horizontal plane as shown in FIGURES 1a and 2a respectively.

As will be seen from FIGURES 2a and 2b, the two collimators $K_1$ and $K_2$ are each constituted by a positive member $p$ and a negative member $n$. Each positive member consists of two biconvex lenses with a biconcave lens between them, all three being air spaced. Each negative member consists of a biconcave lens onto which there is cemented a biconvex lens, the biconvex lens being on the side away from the positive member. It should be noted that the collimators $K_1$ and $K_2$ in FIGURES 2a and 2b are teleobjectives. The spherical aberration of each of these teleobjectives is $\frac{1}{3000}$, the chromatic aberration $\frac{1}{1500}$ and the distortion amounts to 0.2% for a 3° angle.

The teleobjectives in the specific embodiment of the present invention herein described have advantages similar to those of catadioptric systems, i.e. the focal distance of these teleobjectives is shorter than their focal length, their relative aperture greater than that of an astronomical objective of the same focal length and the light path remains a straight one; this means that, for a given type of small size electrophoresis apparatus, it is possible to achieve the following:

(1) The focal distance of the collimators can be reduced from the 650 mm. in conventional apparatus to 400 mm. and, therefore, the overall length of the apparatus from 2700 mm. to 2200 mm.

(2) The relative aperture of the collimators can be raised from 1:10 to 1:5.6 which is equivalent to an increase of the free aperture from 65 mm. to 100 mm. in diameter, thus enabling the operator to use all cell sets of 84 mm. in height instead of 60 mm. in height.

(3) The disadvantages of a deviated light path are avoided.

It is thought that the invention and its advantages will be understood from the foregoing description and it is apparent that various changes may be made in the form, construction and arrangement of the parts without departing from the spirit and scope of the invention or sacrificing its material advantages, the form hereinbefore described and illustrated in the drawings being merely a preferred embodiment thereof.

I claim:

1. A Tiselius type electrophoresis apparatus, comprising a source of light, a condenser lens receiving light from said source of light, a first rotatable disc having diffusing means therein at the focal point of said condenser lens, a first collimator lens positioned for receiving light from said first rotatable disc and for collimating the light, a thermostatically controlled chamber through which said collimated light passes, a second mirror reflecting collimator lens positioned to receive light from said chamber, a second rotatable disc having diffusing means thereon positioned to receive light from said second collimator lens, an objective, a cylindrical lens system and a light receiving surface on which the light can shine, the objective and cylindrical lens system being positioned between said second rotatable disc and said surface, each said collimator lens consisting of a teleobjective of a diameter of at most 10 mm., and having spherical and chromatic aberrations less than $1/1000$ of the focal length and a distortion at most 0.3% for a 3° angle; each teleobjective consisting of a positive member constituted by two biconvex lenses with a biconcave lens between them, all three lenses being air spaced, and of a negative member constituted by a biconcave lens and a biconvex lens.

2. In a Tiselius type electrophoresis apparatus having a source of light, a condenser lens receiving light from said source of light, a first rotatable disc having diffusing means therein at the focal point of said condenser lens, a thermostatically controlled chamber through which light from said disc passes, a second rotatable disc having diffusing means thereon positioned on the other side of said chamber from said first roatable disc, an objective, a cylindrical lens system and a light receiving surface on which the light can shine, the objective and cylindrical lens system being positioned between said second rotatable disc and said surface, that improvement comprising a first collimator lens positioned between said first rotatable disc and said chamber for collimating the light, and a second collimator lens positioned between said chamber and said second rotatable disc to receive light from said chamber and pass it to said second disc, each said collimator lens consisting of a teleobjective of a diameter of at most 100 mm., and having spherical and chromatic aberrations less than $1/1000$ of the focal length and a distortion at most 0.3% for a 3° angle; each teleobjective consisting of a positive member constituted by two biconvex lenses with a biconcave lens between them, all three lenses being air spaced, and of a negative member constituted by a biconcave lens and a biconvex lens.

References Cited

UNITED STATES PATENTS

| 2,780,955 | 2/1957 | Wiedemann | 88—14 |
| 3,004,466 | 10/1961 | Wiedemann | 88—14 |

FOREIGN PATENTS

| 721,807 | 1/1955 | Great Britain. |

JOHN H. MACK, *Primary Examiner.*

E. ZAGARELLIA, *Assistant Examiner.*